(12) United States Patent
Bell et al.

(10) Patent No.: US 12,661,710 B2
(45) Date of Patent: *Jun. 23, 2026

(54) MANUFACTURING COMPONENT USING HIGH AND LOW MELT BRAZE

(71) Applicant: Pratt & Whitney Canada Corp., Longueuil (CA)

(72) Inventors: Donald B. Bell, Wichita Falls, TX (US); Charles Trent Daulton, Burkburnett, TX (US); Kevin M. Tracy, Wichita Falls, TX (US)

(73) Assignee: Pratt & Whitney Canada Corp., Longueuil (CA)

( * ) Notice: Subject to any disclaimer, the term of this patent is extended or adjusted under 35 U.S.C. 154(b) by 627 days.

This patent is subject to a terminal disclaimer.

(21) Appl. No.: 18/117,258

(22) Filed: Mar. 3, 2023

(65) Prior Publication Data

US 2024/0293864 A1     Sep. 5, 2024

(51) Int. Cl.
| | |
|---|---|
| *B22F 10/25* | (2021.01) |
| *B23K 1/00* | (2006.01) |
| *B23K 35/02* | (2006.01) |
| *B33Y 10/00* | (2015.01) |
| *B33Y 70/00* | (2020.01) |

(52) U.S. Cl.
CPC ........... *B22F 10/25* (2021.01); *B23K 1/0018* (2013.01); *B23K 35/0244* (2013.01); *B33Y 10/00* (2014.12); *B33Y 70/00* (2014.12)

(58) Field of Classification Search
CPC .... B23K 1/0018; B23K 35/0233–0238; B23K 2101/001; B22F 2207/01
See application file for complete search history.

(56) References Cited

U.S. PATENT DOCUMENTS

| | | | |
|---|---|---|---|
| 4,614,296 | A | 9/1986 | Lesgourgues |
| 5,071,054 | A | 12/1991 | Dzugan |
| 5,156,321 | A | 10/1992 | Liburdi |
| 5,806,751 | A | 9/1998 | Schaefer |
| 6,187,450 | B1 | 2/2001 | Budinger |
| 6,276,597 | B1 | 8/2001 | Budinger |
| 6,283,356 | B1 | 9/2001 | Messelling |
| 6,464,128 | B1 | 10/2002 | Messelling |

(Continued)

FOREIGN PATENT DOCUMENTS

| | | |
|---|---|---|
| EP | 2450471 A1 | 5/2012 |
| EP | 3933527 A1 | 1/2022 |

(Continued)

OTHER PUBLICATIONS

EP search report for EP24161018.7 dated Jul. 17, 2024.

*Primary Examiner* — Sally A Merkling
*Assistant Examiner* — Sean P. O'Keefe
(74) *Attorney, Agent, or Firm* — Getz Balich LLC

(57) ABSTRACT

A method is provided during which a first braze material is disposed on a substrate. The first braze material has a first melting point. A second braze material is disposed on the first braze material. The second braze material has a second melting point that is less than the first melting point. The first braze material and the second braze material are heated to melt the first braze material and the second braze material and diffusion bond the first braze material and the second braze material to the substrate to provide a cladding on the substrate.

18 Claims, 6 Drawing Sheets

(56)  References Cited

U.S. PATENT DOCUMENTS

| | | | |
|---|---|---|---|
| 6,520,401 | B1 | 2/2003 | Miglietti |
| 8,140,179 | B2 | 3/2012 | Drechsler |
| 8,910,361 | B2 | 12/2014 | Rickenbacher |
| 9,023,423 | B2 | 5/2015 | Bucci |
| 9,174,312 | B2 | 11/2015 | Baughman |
| 9,505,172 | B2 | 11/2016 | Ljungblad |
| 9,764,517 | B2 | 9/2017 | Potter |
| 9,884,369 | B2 | 2/2018 | Lancaster-Larocque |
| 9,902,024 | B2 | 2/2018 | Ernst |
| 10,814,439 | B2 | 10/2020 | Ozturk |
| 11,097,350 | B2 | 8/2021 | Twelves, Jr. |
| 11,285,538 | B2 | 3/2022 | Shi |
| 11,305,353 | B2 | 4/2022 | Geisen |
| 11,305,363 | B2 | 4/2022 | Xu |
| 11,559,847 | B2 | 1/2023 | Cui |
| 2009/0026182 | A1 | 1/2009 | Hu |
| 2014/0099516 | A1* | 4/2014 | Hunt ...................... C22C 19/05 |
| | | | 416/223 R |
| 2014/0220376 | A1 | 8/2014 | Schick |
| 2015/0217415 | A1 | 8/2015 | Andolfi |
| 2018/0243866 | A1 | 8/2018 | Srinivasan |
| 2020/0164465 | A1 | 5/2020 | Burbaum |
| 2021/0069832 | A1 | 3/2021 | Burbaum |
| 2021/0299802 | A1 | 9/2021 | Shin |
| 2022/0212396 | A1 | 7/2022 | Tardif |
| 2022/0212397 | A1 | 7/2022 | Edy |
| 2022/0241881 | A1 | 8/2022 | Xu |
| 2024/0293869 | A1* | 9/2024 | Bell ........................ B22F 10/50 |

FOREIGN PATENT DOCUMENTS

| | | | | | |
|---|---|---|---|---|---|
| FR | 3103401 | A1 * | 5/2021 | .......... | C23C 24/087 |
| JP | 2005000940 | A | 1/2005 | | |
| JP | 2009025119 | A | 2/2009 | | |
| WO | 2019177607 | A1 | 9/2019 | | |

* cited by examiner

300

Provide substrate
302

Prepare component for braze
304

Deposit braze powder(s)
306

Heat sintered braze material(s)
308

Provide repaired/restored component
310

MANUFACTURING COMPONENT USING HIGH AND LOW MELT BRAZE

TECHNICAL FIELD

This disclosure relates generally to manufacturing a component and, more particularly, to manufacturing the component using braze.

BACKGROUND INFORMATION

Defects in a component may be repaired using braze filler material or weld filler. Various processes are known in the art for applying braze filler material and for welding filler material to a component. Various braze filler compositions are also known in the art. While these known processes and filler materials have various advantages, there is still room in the art for improvement.

SUMMARY

According to an aspect of the present disclosure, a method is provided during which a first braze material is disposed on a substrate. The first braze material has a first melting point. A second braze material is disposed on the first braze material. The second braze material has a second melting point that is less than the first melting point. The first braze material and the second braze material are heated to melt the first braze material and the second braze material and diffusion bond the first braze material and the second braze material to the substrate to provide a cladding on the substrate.

According to another aspect of the present disclosure, another method is provided during which a substrate is provided with a first braze material and a second braze material. The first braze material is arranged on the substrate. The first braze material includes a first ratio of a metal alloy component to a braze component. The second braze material is arranged on the first braze material. The second braze material includes a second ratio of the metal alloy component to the braze component. The second ratio is less than the first ratio. The first braze material and the second braze material are heated to melt the first braze material and the second braze material and diffusion bond the first braze material and the second braze material to the substrate.

According to still another aspect of the present disclosure, another method is provided during which high melt braze material is arranged on a substrate. Low melt braze material is arranged on the high melt braze material. A braze cladding is formed on the substrate. The forming of the braze cladding includes melting the high melt braze material and the low melt braze material to diffusion bond the high melt braze material and the low melt braze material to the substrate. At least some of the low melt braze material diffuses across the high melt braze material into the substrate during the diffusion bonding.

The second braze material may have a lower melting point than the first braze material.

The first braze material may include a metal alloy component and a braze component. The braze component may have a lower melting point than the metal alloy component.

The first braze material may have a first ratio of the metal alloy component to the braze component. The second braze material may include the metal alloy component and the braze component. The second braze material may have a second ratio of the metal alloy component to the braze component that is less than the first ratio.

The metal alloy component and the substrate may be or otherwise include a common metal alloy.

The substrate may be or otherwise include a cobalt alloy.

The substrate may be or otherwise include an aluminum alloy.

The first braze material and/or the second braze material may each include boron.

The first braze material and/or the second braze material may each include silicon.

The first braze material may be a sintered first braze material. The disposing of the first braze material may include depositing first braze powder on the substrate. The first braze powder may be sintered to the substrate during the depositing of the first braze powder to provide the sintered first braze material.

The depositing of the first braze powder: directing the first braze powder towards the substrate through a nozzle; and sintering the first braze powder using a laser beam.

The second braze material may be a sintered second braze material. The disposing of the second braze material may include depositing second braze powder on the first braze material. The second braze powder may be sintered to the first braze material during the depositing of the second braze powder to provide the sintered second braze material.

The depositing of the second braze powder may include: directing the second braze powder towards the first braze material through a nozzle; and sintering the second braze powder using a laser beam.

The first braze material may be disposed on the substrate and/or the second braze material may be disposed on the first braze material using an additive manufacturing device.

The method may also include laying a braze tape on the substrate. The braze tape may include the first braze material and the second braze material. The laying of the braze tape may include the disposing of the first braze material and the disposing of the second braze material.

The first braze material may be provided in a first braze tape. The disposing of the first braze material may include laying the first braze tape on the substrate. In addition or alternatively, the second braze material may be provided in a second braze tape. The disposing of the second braze material may include laying the second braze tape on the first braze material.

The heating of the first braze material and the second braze material may be performed in a vacuum furnace subsequent to the depositing of the first braze material and the second braze material.

The substrate may be a part of a component of an engine.

The engine may be a gas turbine engine, a ramjet engine or a scramjet engine.

The substrate may be a part of oil and/or gas drilling equipment or mining equipment.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
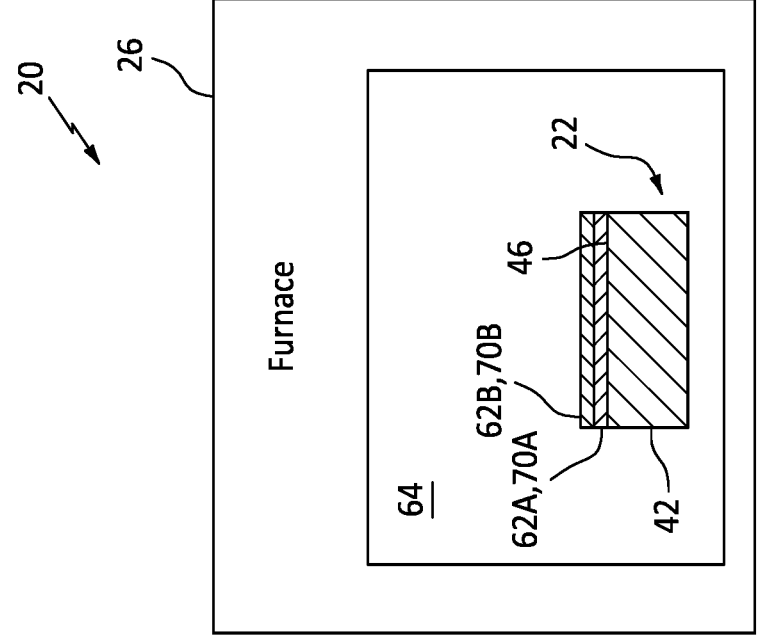
FIG. 1 is a schematic illustration of a system for manufacturing a component.
Figure 1:
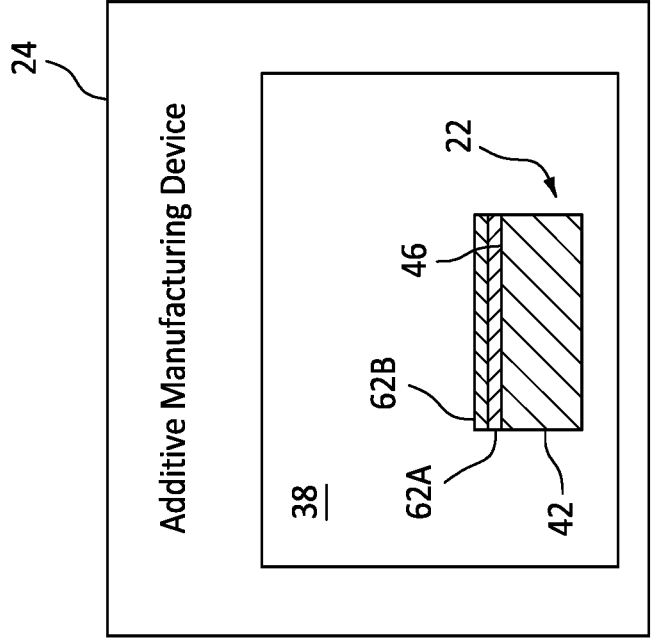

The present disclosure includes systems and methods for manufacturing a component. Herein, the term "manufacturing" may describe a process for forming the component; e.g., creating a brand new component. The term "manufacturing" may also or alternatively describe a process for repairing the component; e.g., restoring one or more features of a previously formed component to brand new condition, similar to brand new condition or better than brand new condition. The component, for example, may be repaired to fix one or more defects (e.g., cracks, wear and/or other damage) imparted during previous use of the component. The component may also or alternatively be repaired to fix one or more defects imparted during the initial formation of the component. For ease of description, the manufacturing systems and methods may be described below with respect to repairing the component.

The component may be any stationary component within a hot section of the gas turbine engine; e.g., a combustor section, a turbine section or an exhaust section. Examples of the stationary component include, but are not limited to, a vane, a platform, a gas path wall, a liner and a shroud. The present disclosure, however, is not limited to stationary component applications. The engine component, for example, may alternatively be a rotor blade; e.g., a turbine blade. The present disclosure is also not limited to hot section engine components. For ease of description, however, the manufacturing systems and methods may be described below with respect to repairing a gas turbine engine component such as a turbine vane or other stators within the turbine section.

The component may be included in various gas turbine engines. The component, for example, may be included in a geared gas turbine engine where a geartrain connects one or more shafts to one or more rotors in a fan section, a compressor section and/or any other engine section. Alternatively, the component may be included in a direct-drive gas turbine engine configured without a geartrain. The component may be included in a gas turbine engine configured with a single rotating structure (e.g., spool) or with two or more rotating structures. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines. Furthermore, it is contemplated the manufacturing systems and methods of the present disclosure may alternatively be used to manufacture component(s) for non-gas turbine engine applications; e.g., for reciprocating piston internal combustion engine applications, for rotary internal combustion engine applications, ramjet engines, scramjet engines, oil and/or gas drilling equipment, mining equipment, etc.

FIG. 1 schematically illustrates an exemplary system 20 for manufacturing (e.g., repairing or forming) the component 22. This manufacturing system 20 includes an additive manufacturing device 24 (e.g., a three-dimensional (3D) printer) and a furnace 26.

Figure 2:
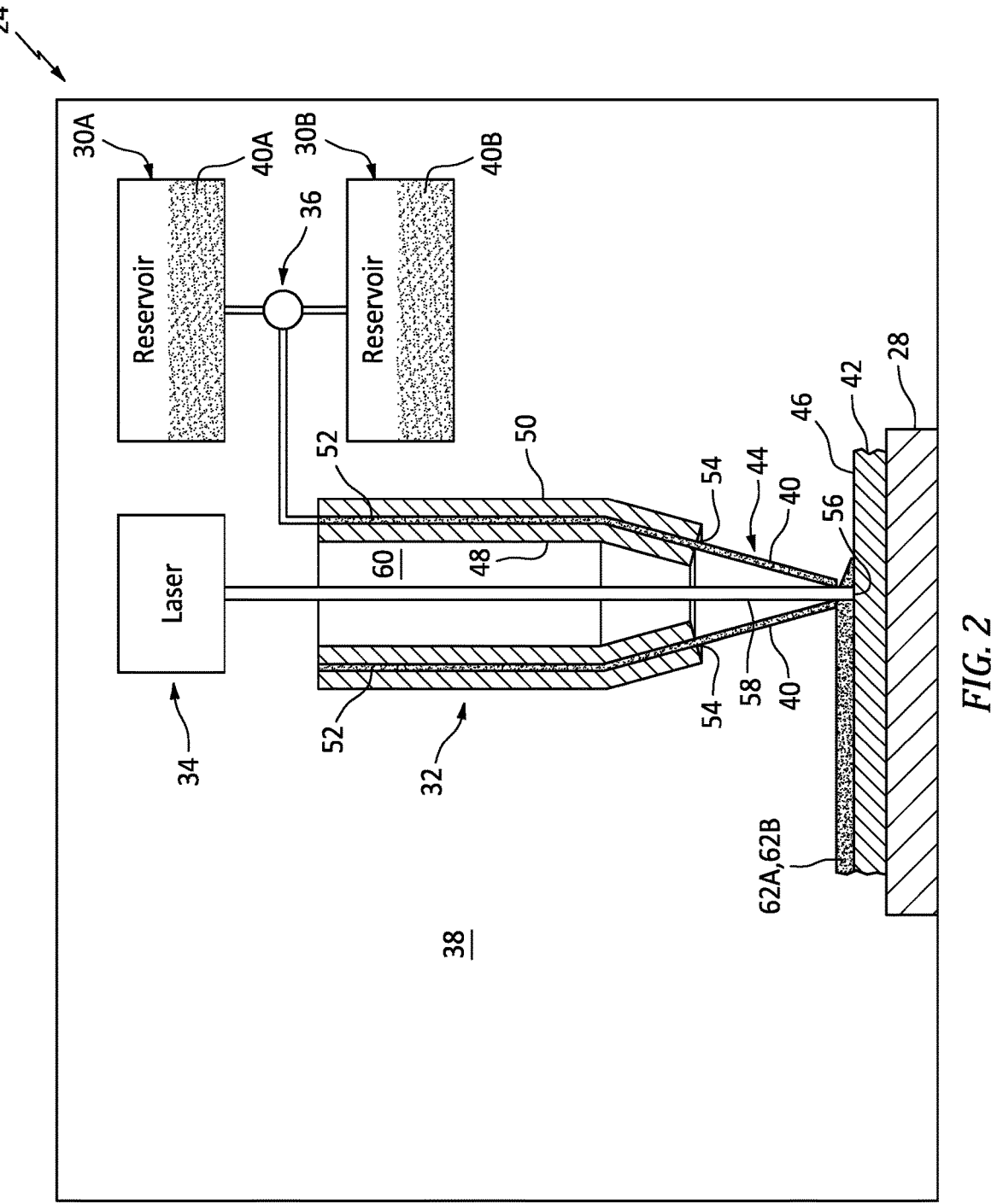
FIG. 2 is a schematic illustration of an additive manufacturing device.

Referring to FIG. 2, the additive manufacturing device 24 may be configured as a laser material deposition device. More particularly, the additive manufacturing device 24 may be configured as a direct laser braze cladding (DLBC) device. The additive manufacturing device 24 of FIG. 2, for example, includes a component support 28, one or more material reservoirs 30A and 30B (generally referred to as "30"), at least (or only) one nozzle 32, and at least (or only) one laser 34. The additive manufacturing device 24 of FIG. 2 also includes a material regulation device 36.

The component support 28 is located within an internal build chamber 38 of the additive manufacturing device 24. This component support 28 is configured to support the component 22 within the build chamber 38. The component 22, for example, may be placed on top of the component support 28. The component 22 may also or alternatively be mounted to the component support 28 via a fixture, which fixture may arrange the component 22 in a fixed position and/or in a known spatial orientation within the build chamber 38.

The first material reservoir 30A is configured to store a quantity of first braze powder 40A. This first material reservoir 30A is also configured to supply the first braze powder 40A to the nozzle 32 (e.g., through the material regulation device 36) during select additive manufacturing device operations. Examples of the first material reservoir 30A include, but are not limited to, a tank, a hopper and a bin.

The second material reservoir 30B is configured to store a quantity of second braze powder 40B. This second material reservoir 30B is also configured to supply the second braze powder 40B to the nozzle 32 (e.g., through the material regulation device 36) during select additive manufacturing device operations. Examples of the second material reservoir 30B include, but are not limited to, a tank, a hopper and a bin.

The material regulation device 36 is fluidly coupled with and between the material reservoirs 30 and the nozzle 32. The material regulation device 36 is configured to selectively direct the first braze powder 40A from the first material reservoir 30A to the nozzle 32 during a first mode. The material regulation device 36 is configured to selectively direct the second braze powder 40B from the second material reservoir 30B to the nozzle 32 during a second mode. The material regulation device 36 may also (or may not) be configured to selectively direct one or more combinations of the first braze powder 40A from the first material reservoir 30A and the second braze powder 40B from the second material reservoir 30B to the nozzle 32 during a third mode. Examples of the material regulation device 36 include, but are not limited to, a valve or valves, a pump or pumps, a powder wheel or wheels, an auger or augers, and a powder metering wheel or wheels.

The nozzle 32 is configured to deliver the first braze powder 40A received from the first material reservoir 30A, the second braze powder 40B received from the second material reservoir 30B or a combination of the first braze powder 40A and the second braze powder 40B to a substrate 42 of the component 22 during additive manufacturing device operation. More particularly, the nozzle 32 is configured to direct a (e.g., annular, conical) stream 44 of the braze powder 40A and/or 40B (generally referred to as "40") toward (e.g., to) a surface 46 of the substrate 42. The nozzle 32 of FIG. 2, for example, includes a tubular inner sidewall 48 and a tubular outer sidewall 50. The outer sidewall 50 extends axially along and circumscribes the inner sidewall 48 so as to form a passage 52 (e.g., an annulus) between the inner sidewall 48 and the outer sidewall 50. This passage 52 is fluidly coupled with outlets from the material reservoirs 30 through the material regulation device 36, and the passage 52 extends axially within the nozzle 32 to a (e.g., annular) nozzle orifice 54. A distal end portion of the nozzle 32 and its inner sidewall 48 and its outer sidewall 50 may radially taper inwards as the nozzle 32 extends axially toward (e.g., to) the nozzle orifice 54. With such an arrangement, the nozzle 32 may focus the braze powder 40 to, around or about a target point 56 on, slightly above or slightly below the substrate surface 46. However, in alternative embodiments, the nozzle 32 may be configured to deliver the braze powder 40 through an internal bore rather than an annulus.

The laser 34 is configured to generate a laser beam 58 for sintering the braze powder 40 delivered by the nozzle 32 together and to the substrate 42. Herein, the term "sintering" may describe a process for coalescing powder particles together into a (e.g., porous) mass by heating without (e.g., partial or complete) liquification of the powder. This is in contrast to, for example, a powder laser welding process where powder is melted to a liquid state (e.g., in a melt pool) by a laser beam and then solidified as a solid mass. The laser 34 of FIG. 2 is configured to direct the laser beam 58 to or about the target point 56, where the laser beam 58 may be incident with and is operable to heat up the braze powder 40 for sintering. The laser beam 58 of FIG. 2 is directed through an (e.g., central) internal bore 60 of the nozzle 32, which internal nozzle bore 60 may be formed by the inner sidewall 48. However, in other embodiments, the laser 34 may be configured to direct the laser beam 58 outside of the nozzle 32 or along another path through the nozzle 32.

Referring to FIG. 1, the furnace 26 is configured to receive the substrate 42 with the sintered first braze material 62A and/or the sintered second braze material 62B (generally referred to as "62") within an internal treatment chamber 64 of the furnace 26. The furnace 26 is further configured to subject the substrate 42 and the sintered braze material(s) 62 to a heat cycle, for example under vacuum and/or in a partial pressure inert gas (e.g., argon (Ar) gas) environment. During this heat cycle, the sintered braze material(s) 62 may melt and diffusion bond to the substrate 42. An example of the furnace 26 is a vacuum furnace.

Figure 3:
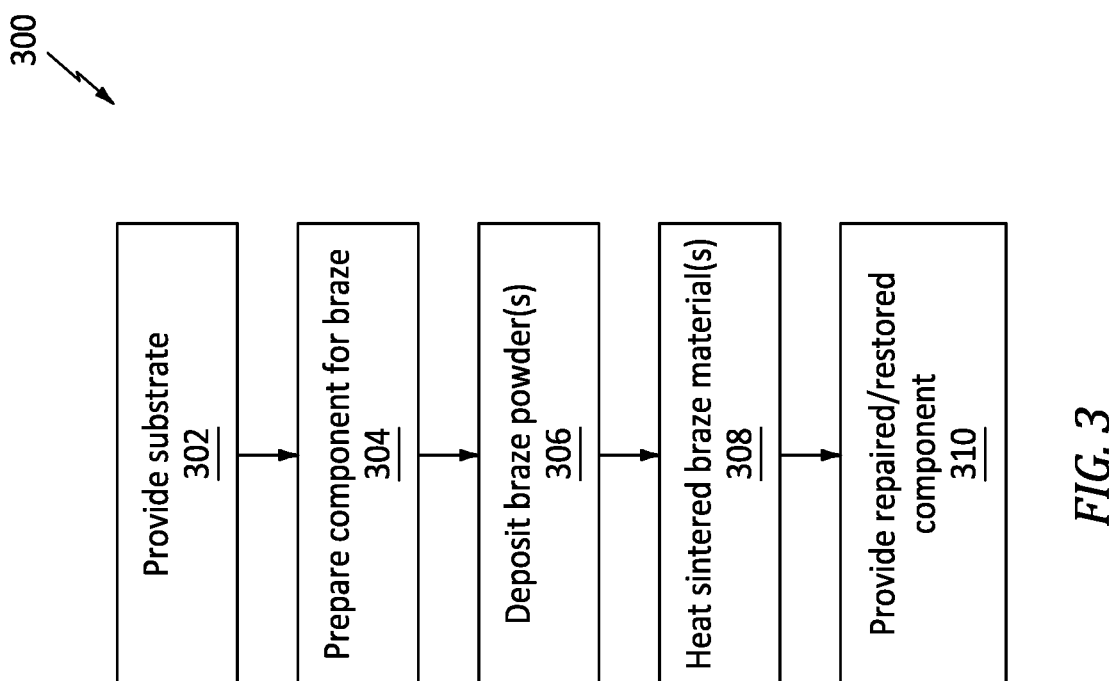
FIG. 3 is a flow diagram of a method for manufacturing the component.

FIG. 3 is a flow diagram of an exemplary method 300 for manufacturing (e.g., repairing or forming) the component 22. For ease of description, the manufacturing method 300 is described with respect to the manufacturing system 20 and repairing the component 22. The manufacturing method 300, however, is not limited to any particular manufacturing types or configurations. Furthermore, some or all of the method steps may alternatively be performed to form a new component.

Figures 4, 5, 6, 7, 8, 9:
FIGS. 4-9 are partial sectional illustrations of the component during various steps of the manufacturing method.

In step 302, referring to FIG. 4, the substrate 42 is provided. For ease of description, this substrate 42 is described as part of a damaged component. The component 22 of FIG. 4, for example, includes a wear region 66 where a portion of the component 22 and its substrate 42 has been worn away due to, for example, erosion, rubbing and/or otherwise. Of course, in other embodiments, the component 22 may include multiple of the wear regions and/or one or more other defects. An example of another defect is a void such as, but not limited to, a crack, a fracture, a slice, a gouge, a dimple, etc. In still other embodiments, the component 22 may not include any defects and the braze may be included to otherwise build up the substrate 42.

In step 304, referring to FIG. 5, the component 22 is prepared for the braze powder. A coating 68 (see FIG. 4) over at least a portion or an entirety of the substrate 42, for example, may be removed to expose the underlying substrate 42 and its substrate surface 46. The coating 68 may be removed using various techniques such as, but not limited to, chemical stripping, abrasive blasting, waterjet blasting and/or machining. The substrate surface 46 may also be prepared (e.g., treated) for braze powder deposition. Examples of such surface preparation may include, but are not limited to: fluoride ion cleaning (FIC); reverse electroplating, electroplating to introduce a more wettable interface, such as nickel (Ni); nickel honing (e.g., nicroblasting); acid etching; and/or wet abrasive honing.

In step 306, referring to FIGS. 2, 6 and 7, the first braze powder 40A and the second braze powder 40B are selectively deposited with the substrate 42 using the additive manufacturing device 24. The first braze powder 40A, for example, may be deposited on the substrate 42 and sintered to provide the sintered first braze material 62A. This sintered first braze material 62A may at least partially or completely fill in the wear region 66 and/or build up one or more other (e.g., non-wear) regions of the substrate 42. The second braze powder 40B may be deposited on the sintered first braze material 62A and sintered to provide the sintered second braze material 62B. This sintered second braze material 62B may be provided to further fill in the wear region 66 and/or build up one or more other (e.g., non-wear) regions of the substrate 42. The sintered second braze material 62B may also or alternatively be provided to facilitate and/or improve subsequent diffusion bonding between the sintered first braze material 62A and the substrate 42. Here, the sintered first braze material 62A is between (e.g., and completely separates) the substrate 42 from the sintered second braze material 62B prior to diffusion.

The first braze powder 40A may be configured as a high melt braze powder. The first braze powder 40A, for example, may be selected to have a first (e.g., relatively high) melting point. The second braze powder 40B, on the other hand, may be configured as a low melt braze powder. The second braze powder 40B, for example, may be selected to have a second (e.g., relatively low) melting point, where the second melting point is less than the first melting point. The first melting point, for example, may be between 1.1 times the second melting point and 2.0 times the second melting point. The first and the second melting points may be between 1500 degrees and 2500 degrees Fahrenheit; however, the present disclosure is not limited to such an exemplary temperature range.

The first braze powder 40A may at least (or only) include a mixture of metal alloy component powder (a metal alloy component of the braze powder 40) and metal braze component powder (a braze component of the braze powder 40). The second braze powder 40B may also at least (or only) include a mixture of the metal alloy component powder and the braze component powder. However, a ratio of the metal alloy component powder to the braze component powder in the second braze powder 40B is less than a ratio of the metal alloy component powder to the braze component powder in the first braze powder 40A. The present disclosure, however, is not limited to the foregoing exemplary relationship. For example, in other embodiments, one or more or all of the constituent materials in the first braze powder 40A may be different that one or more or all of the constituent materials in the second braze powder 40B.

The metal alloy component powder may be selected to have a relatively high melting point and common (e.g., the same) or similar material properties as the substrate 42. The metal alloy component powder, for example, may be made from a common (or a similar) material as the underlying substrate 42; e.g., an aluminum (Al) alloy or superalloy, a nickel (Ni) alloy or superalloy, a titanium (Ti) alloy or superalloy, cobalt (Co) alloy or superalloy, etc. The braze component powder, on the other hand, may be selected to have a relatively low melting point, which is less than the melting point of the metal alloy component powder. The braze component powder, for example, may include a common or similar base element as the substrate 42 and/or the metal alloy component powder (e.g., aluminum (Al), nickel (Ni) or titanium (Ti)) without one or more or any of the alloying elements/the super alloying elements. The brazing component powder may also or alternatively include boron (B), silicon (Si) and/or other melting point suppressants which may help facilitate melting and diffusion of the metal alloy component powder with the substrate 42. The present disclosure, however, is not limited to the foregoing exemplary braze materials.

During the braze powder deposition, the additive manufacturing device 24 of FIG. 2 may dispose the respective braze powder 40 with the substrate 42 at or about the target point 56. The laser 34 may concurrently sinter this respective braze powder 40 at the target point 56 together and/or to the underlying substrate 42. Referring to FIGS. 2 and 6, the additive manufacturing device 24 may be positioned and operated to provide the sintered first braze material 62A over the substrate surface 46; e.g., partially or completely filling the wear region 66, building up the substrate 42, etc. Referring to FIGS. 2 and 7, the additive manufacturing device 24 may be positioned and operated to provide the sintered second braze material 62B over the sintered first braze material 62A; e.g., further filling the wear region 66 (where applicable), further building up the substrate 42, etc.

The additive manufacturing device 24 may selectively deposit the first braze powder 40A and/or the second braze powder 40B over the substrate 42 such that (e.g., only) areas which need repair (and optionally areas adjacent and/or surrounding those areas) are coated with the sintered first braze material 62A and/or the sintered second braze material 62B. Of course, in other embodiments, the first braze powder 40A and/or the second braze powder 40B may be deposited over an entirety of the substrate 42 where excess material may later be removed. The first braze powder 40A and/or the second braze powder 40B may each be deposited (e.g., built up) as one or more layers during the step 306.

In step 308, referring to FIG. 8, the substrate 42 and the sintered braze materials 62 are heated. The substrate 42 with the sintered braze materials 62, for example, may be arranged within the treatment chamber 64 of the furnace 26 of FIG. 1. The furnace 26 may subject the substrate 42 with the sintered braze materials 62 to a heat cycle. More particularly, the substrate 42 with the sintered braze materials 62 may be heated to an elevated temperature within a partial pressure inert gas environment. The elevated temperature is selected such that the sintered braze materials 62 melt, wet and flow into defects of the substrate 42 by capillary action. Once the sintered braze materials 62 have melted, a relatively lower temperature may be selected and held in the same heat cycle or different heat cycles for a duration. This sustained temperature may facilitate diffusion of the melting point suppressant material. This diffusion of the melting point suppressant material may facilitate athermal solidification, resulting in a braze diffusion bond of the sintered materials 62 to the substrate 42. The athermal solidification may describe solidification of the melted sintered braze materials 62 under, for example, a constant temperature. The diffusion duration may be between four (4) hours and twelve (12) hours, but may be much shorter or longer depending on materials being diffusion brazed and/or desired material properties. This elevated temperature, however, is less than a melting point temperature of the substrate material. The elevated temperature for the braze melt, for example, may be between 1,500° F. and 2,500° F. The elevated temperature for the braze diffusion, for example, may be between 1,000° F. and 2,400° F. The inert gas environment may have a vacuum pressure range between, for example, 0.5 microns and 0.1 microns. The present disclosure, however, is not limited to the foregoing exemplary heat cycle parameters, and the foregoing heat cycle parameters may vary depending upon the specific material composition of the substrate 42 and the braze material, dimensions (e.g., thickness) of the sintered braze materials, etc.

Figure 10:
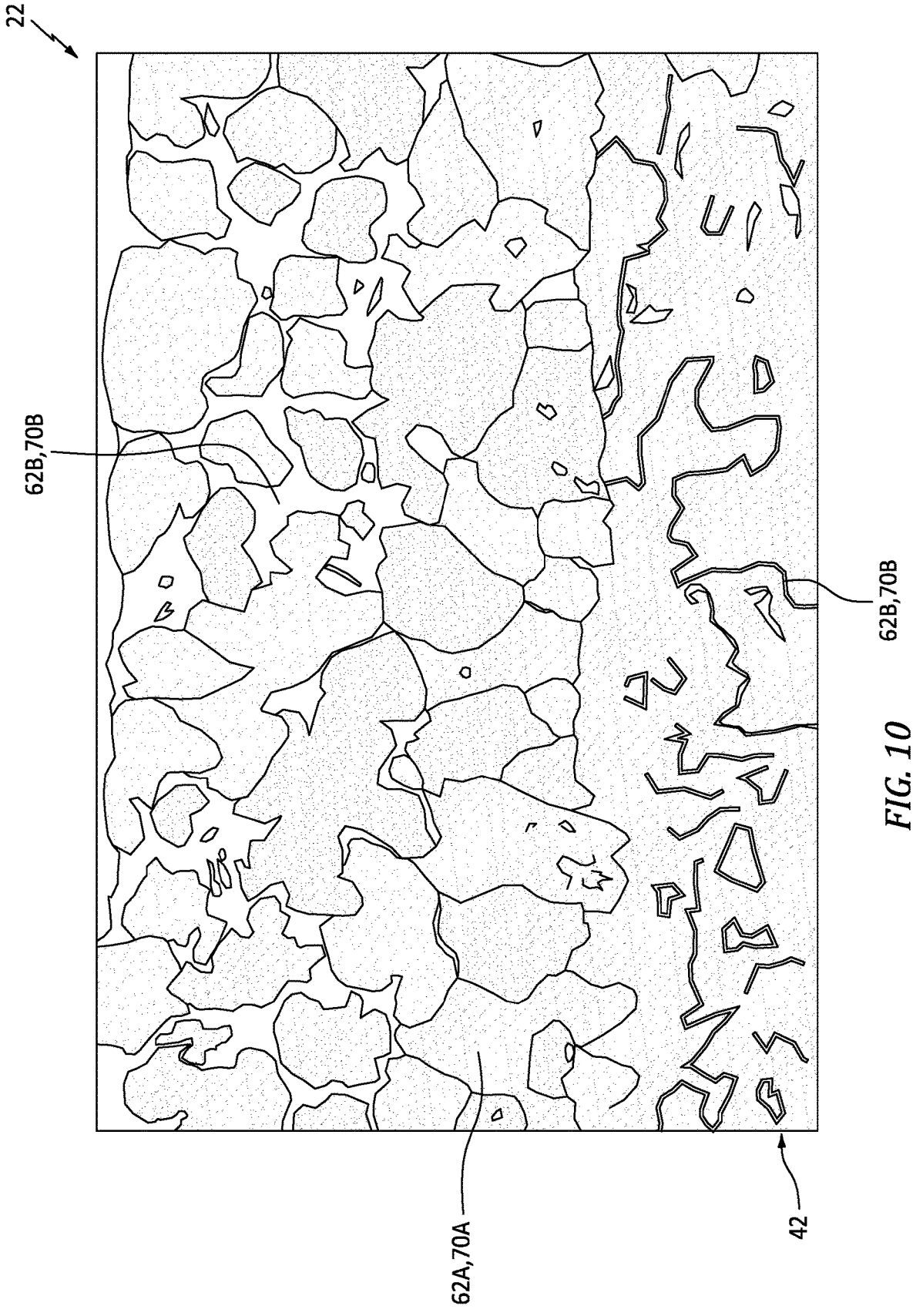
FIG. 10 is a sectional illustration through the component following diffusion of braze materials into a substrate.

Referring to FIG. 10, during the heating process, the melted first braze material 62A partially diffuses into the underlying substrate 42. The melted second braze material 62B may at least partially diffuse into the underlining first braze material 62A as well as into the underlying substrate 42. The second braze material 62B may thereby facilitate and/or improve diffusion bonding between the first braze material 62A and the underlying substrate 42. However, because the first braze material 62A is initially disposed between the second braze material 62B and the substrate 42, the second braze material 62B may not over diffuse into the substrate 42 (or diffuse completely through the substrate 42). In other words, arranging the first braze material 62A between the substrate 42 and the second braze material 62B configures the first braze material 62A as a buffer to slow second braze material diffusion. Furthermore, since the second braze material 62B has a lower melting point than the first braze material 62A, arranging the first braze material 62A between the substrate 42 and the second braze material 62B may prevent floating of the first braze material 62A above the substrate 42 which may be possible under certain conditions if the second braze material 62B was alternatively arranged between the substrate 42 and the first braze material 62A.

Following the heating step 308, first braze filler material 70A (e.g., the melted and diffusion bonded first braze material) and/or second braze filler material 70B (e.g., the melted and diffusion bonded second braze material) of FIG. 8 may heal the wear region 66 as well as other defects such as, but not limited to, (e.g., small) voids, etc. Note, the first braze filler material 70A and the second braze filler material 70B are schematically shown in FIGS. 8 and 9 as separate layers for ease of illustration; however, as shown in FIG. 10, the first braze filler material 70A and the second braze filler material 70B may be mixed together following diffusion. The first braze filler material 70A and/or the second braze filler material 70B of FIG. 8 may partially or completely fill the wear region 66. The first braze filler material 70A and/or the second braze filler material 70B may also or alternatively restore a dimensional parameter of and/or reinforce the wear region 66 and/or other regions of the component 22. The first braze filler material 70A and/or the second braze filler material 70B, for example, may buildup the substrate 42 back to or above a dimensional parameter specified therefor by a design specification or a repair specification for the component 22. The braze filler materials thereby clad (form a cladding on) the substrate 42.

In step 310, referring to FIG. 9, the substrate 42 with the braze filler materials 70A and 70B (generally referred to as "70") may be processed (e.g., post-braze processed) to provide a repaired/restored component. Excess braze filler material(s), for example, may be removed, the substrate material and/or the braze filler material(s) may be finished (e.g., sanded, polished, etc.), and/or one or more coatings 72 (e.g., bond coating(s), environmental coating(s), thermal barrier coating(s), etc.) may be applied to the substrate 42 and/or the braze filler material(s).

In some embodiments, referring to FIG. 2, the respective braze powder 40 and the laser beam 58 may be concurrently directed to the common target point 56 for the braze powder deposition. In other embodiments, however, the laser beam 58 may alternatively be directed to a different target point than the respective braze powder 40. The laser beam target point, for example, may alternatively be spaced from and follow the braze powder target point.

In some embodiments, the respective braze powder 40 may be sintered using the laser beam 58. The present disclosure, however, is not limited to use of such an exemplary energy beam. The respective braze powder 40, for example, may alternatively be sintered using an electron beam provided by an electron beam source. Furthermore, multiple energy beams (e.g., laser beams and/or electron beams) may be used for sintering the respective braze powder 40. In addition or alternatively, multiple nozzles may be used to deliver the braze powders 40.

A component manufactured using a typical additive laser deposition welding process may be subject to: internal stresses thermally induced by relatively high welding temperatures (e.g., temperatures high enough to melt the substrate material); thermally induced distortion and/or warping; and/or reduction in material density caused by, for example, dendritic voids. By contrast, sintering the braze powders 40 with the substrate 42 and then diffusion bonding the sintered braze materials with the substrate 42 as described above subjects the substrate 42 to relatively low processing temperatures, compared to welding temperatures. The manufacturing methods of the present disclosure may thereby reduce or eliminate: thermally induced stresses; thermally induced distortion and/or warping; and/or reduction in material density associated with additive laser deposition welding techniques. The above laser braze cladding technique may also be paired with adaptive processing to reduce material consumption and/or require less post processing (e.g., machining, finishing, etc.) compared to traditional manual brazing techniques.

Figures 11A, 11B:
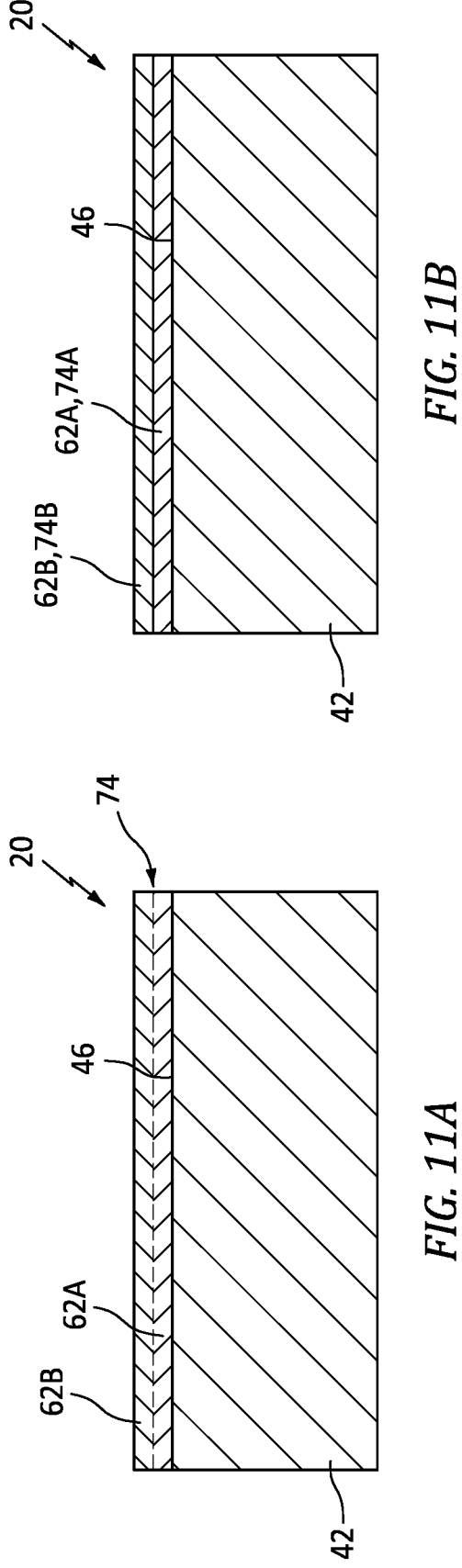
FIGS. 11A and 11B are partial sectional illustrations of the component with various braze arrangements.

While the first braze material 62A and the second braze material 62B are described above as being deposited using the additive manufacturing device 24, the present disclosure is not limited to such an exemplary braze application technique. For example, referring to FIGS. 11A and 11B, one or both of the braze materials 62A, 62B may alternatively be provided with the substrate 42 via a taping technique. For example, referring to FIG. 11A, the first braze material 62A and the second braze material 62B may be configured together as part of a common braze tape 74. This braze tape 74 may be laid onto (e.g., and adhered to) the substrate surface 46. The substrate 42 and the braze tape 74 may then be heated, for example, as described above in step 308 to diffusion bond the braze materials 62 to the substrate 42 and form the cladding over the substrate 42. Alternatively, referring to FIG. 11B, the first braze material 62A may be configured as a first braze tape 74A and the second braze material 62B may be configured as a second braze tape 74B that is discrete from the first braze tape 74A. The first braze tape 74A may be laid onto (e.g., and adhered to) the substrate surface 46. The second braze tape 74B may be laid onto (e.g., and adhered to) the first braze tape 74A. The substrate 42 and the braze tapes 74A and 74B may then be heated, for example, as described above in step 308 to diffusion bond the braze materials 62 to the substrate 42 and form the cladding over the substrate 42. Of course, various other braze application techniques are known in the art, and the present disclosure is not limited to any particular ones thereof. For example, the braze may also or alternatively be applied as a layered multi-braze pre-sintered preform, as a high melt braze preform with a low melt braze slurry over the preform, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method, comprising:

arranging first braze material on a substrate, the first braze material including a first melting point;

depositing second braze material on the first braze material and sintering the second braze material to the first braze material to provide a sintered second braze material, and a second melting point of the second braze material is less than the first melting point; and forming a braze cladding on the substrate, the forming of the braze cladding comprising melting the first braze material and the sintered second braze material to diffusion bond the first braze material and the sintered second braze material to the substrate, wherein at least some of the sintered second braze material diffuses across the first braze material into the substrate during the diffusion bonding.

2. A method, comprising:

disposing a first braze material on a substrate, the first braze material having a first melting point;

depositing second braze powder on the first braze material and sintering the second braze powder to the first braze material to provide a sintered second braze material, the sintered second braze material having a second melting point that is less than the first melting point; and heating the first braze material and the sintered second braze material to melt the first braze material and the sintered second braze material and diffusion bond the first braze material and the sintered second braze material to the substrate to provide a cladding on the substrate.

3. The method of claim 2, wherein the first braze material comprises a metal alloy component and a braze component; and the braze component has a lower melting point than the metal alloy component.

4. The method of claim 3, wherein the first braze material has a first ratio of the metal alloy component to the braze component; and the second braze powder comprises the metal alloy component and the braze component, and the second braze powder has a second ratio of the metal alloy component to the braze component that is less than the first ratio.

5. The method of claim 3, wherein the metal alloy component and the substrate comprise a common metal alloy.

6. The method of claim 2, wherein the substrate comprises a cobalt alloy.

7. The method of claim 2, wherein the substrate comprises an aluminum alloy.

8. The method of claim 2, wherein at least one of the first braze material or the second braze powder comprises boron.

9. The method of claim 2, wherein at least one of the first braze material or the second braze powder comprises silicon.

10. The method of claim 2, wherein the first braze material is a sintered first braze material;

the disposing of the first braze material comprises depositing first braze powder on the substrate; and the first braze powder is sintered to the substrate during the depositing of the first braze powder to provide the sintered first braze material.

11. The method of claim 10, wherein the depositing of the first braze powder comprises directing the first braze powder towards the substrate through a nozzle; and sintering the first braze powder using a laser beam.

12. The method of claim 11, wherein the depositing of the second braze powder further comprises:

directing the second braze powder towards the first braze material through a nozzle; and sintering the second braze powder using a laser beam.

13. The method of claim 2, wherein at least one of the first braze material is disposed on the substrate or the second braze powder is deposited on the first braze material using an additive manufacturing device.

14. The method of claim 2, wherein at least one of the first braze material is provided in a first braze tape, and the disposing of the first braze material comprises laying the first braze tape on the substrate; and the second braze powder is provided in a second braze tape, and the disposing of the second braze powder comprises laying the second braze tape on the first braze material.

15. The method of claim 2, wherein the heating of the first braze material and the sintered second braze material is performed in a vacuum furnace subsequent to the depositing of the first braze material and the second braze powder.

16. The method of claim 2, wherein the substrate is a part of a component of an engine.

17. A method, comprising:

providing a substrate with a first braze material and a second braze material, the first braze material arranged on the substrate, the first braze material comprising a first ratio of a metal alloy component to a braze component, the second braze material arranged on the first braze material and sintered to the first braze material to provide a sintered second braze material, the second braze material comprising a second ratio of the metal alloy component to the braze component, and the second ratio less than the first ratio; and heating the first braze material and the sintered second braze material to melt the first braze material and the sintered second braze material and diffusion bond the first braze material and the sintered second braze material to the substrate.

18. The method of claim 17, wherein the second braze material has a lower melting point than the first braze material.

\* \* \* \* \*